(12) United States Patent
Kono

(10) Patent No.: US 11,189,190 B2
(45) Date of Patent: Nov. 30, 2021

(54) FLYING TRAINING SUPPORT SYSTEM

(71) Applicant: SUBARU CORPORATION, Tokyo (JP)

(72) Inventor: Mitsuru Kono, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 389 days.

(21) Appl. No.: 16/254,313

(22) Filed: Jan. 22, 2019

(65) Prior Publication Data

US 2019/0287417 A1    Sep. 19, 2019

(30) Foreign Application Priority Data

Mar. 13, 2018 (JP) .............................. JP2018-045710

(51) Int. Cl.
*G09B 9/30* (2006.01)

(52) U.S. Cl.
CPC ............. *G09B 9/307* (2013.01); *G09B 9/301* (2013.01)

(58) Field of Classification Search
CPC ... G09B 9/04; G09B 9/06; G09B 9/08; G09B 9/301; G09B 9/307; G09B 9/44
See application file for complete search history.

(56) References Cited

U.S. PATENT DOCUMENTS

| 2011/0311949 | A1* | 12/2011 | Preston | F41G 3/2666 434/16 |
| 2014/0170601 | A1* | 6/2014 | Wokurka | G09B 9/302 434/35 |
| 2016/0325833 | A1 | 11/2016 | Terasaka | |

FOREIGN PATENT DOCUMENTS

| CN | 102591358 A | 7/2012 |
| JP | 3-127371 U | 12/1991 |
| JP | H08-160846 A | 6/1996 |
| JP | 2001-100628 A | 4/2001 |
| JP | 2007-286221 A | 11/2007 |
| JP | 2016-210274 A | 12/2016 |
| JP | 2017-65297 A | 4/2017 |
| JP | 2017-191225 A | 10/2017 |

OTHER PUBLICATIONS

Notice of Reasons for Refusal issued in corresponding Japanese Patent Application No. 2018-045710 dated Oct. 23, 2019, with machine translation.

* cited by examiner

*Primary Examiner* — Timothy A Musselman
(74) *Attorney, Agent, or Firm* — Troutman Pepper Hamilton Sanders LLP

(57) ABSTRACT

A flying training support system includes: a flight condition generator that generates a simulated flight condition of a virtual another aircraft; a relative position derivation unit that derives a relative position of the virtual other aircraft based on the simulated flight condition and a real flight condition of the own aircraft; a display controller that displays an indicator indicating the virtual other aircraft at the relative position of the virtual other aircraft on a transmission display; a variation amount derivation unit that derives a simulated variation amount by which the own aircraft would vary due to flight of the virtual other aircraft, based on the simulated flight condition and the relative position of the virtual other aircraft; and a flight controller that actually varies the own aircraft so as to make the own aircraft in a state where the own aircraft varies by the simulated variation amount.

2 Claims, 3 Drawing Sheets

VARY (ROLL) CLOCKWISE    VARY (ROLL) COUNTERCLOCKWISE

FLYING TRAINING SUPPORT SYSTEM

CROSS-REFERENCE TO RELATED APPLICATIONS

The present application claims priority from Japanese Patent Application No. 2018-045710 filed on Mar. 13, 2018, the entire contents of which are hereby incorporated by reference.

BACKGROUND

1. Technical Field

The present invention relates to a flying training support system that supports flying training.

2. Related Art

Aircraft flying modes include solo flying and formation flying. In the flying training of the formation flying, it is necessary to control not only the flight orientation and velocity of an own aircraft (the aircraft controlled by him/herself) but also to make another aircrafts (friend aircraft that forms a formation with the own aircraft) and the own aircraft have an appropriate positional relationship.

Then, there has been a technique in which a virtual instructor aircraft (VIA) symbol is superimposed on a head-up display of an aircraft to display formation flying with other aircrafts as a virtual reality (for instance, Japanese Unexamined Patent Application Publication (JP-A) H08-160846).

SUMMARY OF THE INVENTION

An aspect of the present invention provides a flying training support system including: a flight condition generator configured to generate a simulated flight condition of a virtual another aircraft; a relative position derivation unit configured to derive a relative position of the virtual other aircraft with respect to an own aircraft based on the simulated flight condition of the virtual other aircraft and a real flight condition of the own aircraft; a display controller configured to display an indicator indicating the virtual other aircraft at the relative position of the virtual other aircraft on a transmission display; a variation amount derivation unit configured to derive a simulated variation amount by which the own aircraft would vary due to flight of the virtual other aircraft, based on the simulated flight condition of the virtual other aircraft and the relative position of the virtual other aircraft; and a flight controller configured to actually varies the own aircraft so as to make the own aircraft in a state where the own aircraft varies by the simulated variation amount.

DETAILED DESCRIPTION

Figure 1:
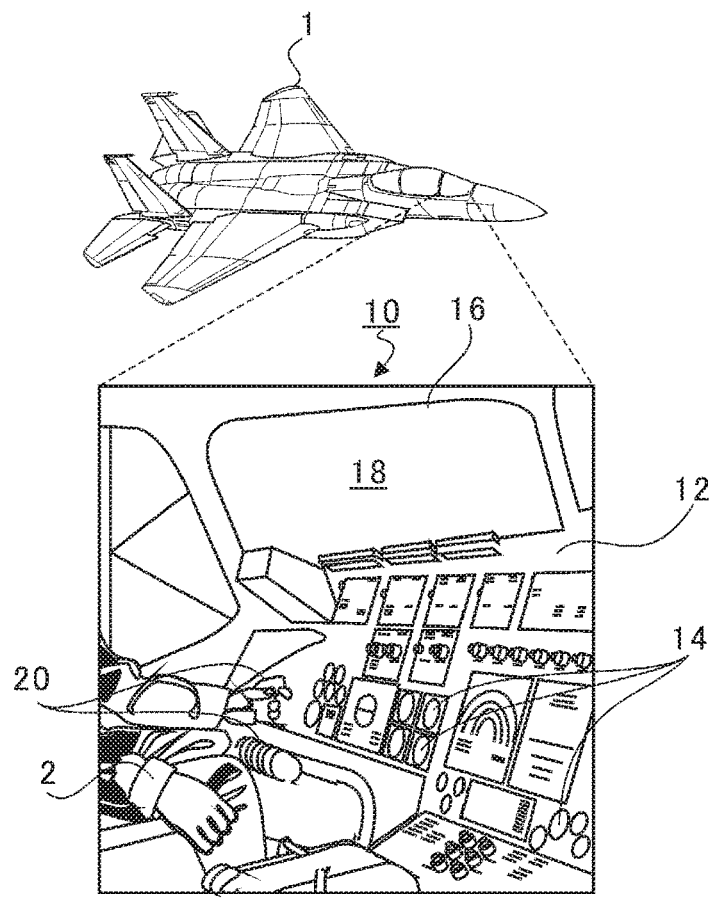
FIG. 1 is a schematic view illustrating a cockpit of an aircraft.

Hereinafter, examples of the present invention will be described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. In the specification and the drawings, elements having substantially the same functions and configurations are denoted by the same reference numerals. Redundant description will be omitted. Elements which are not directly related to the examples of the present invention will not be illustrated in the drawings.

When training a pilot, flying training using an actual aircraft is essential. However, performing formation flying training involves cost depending on the number of aircrafts used. Further, although it is training, there is a danger that an own aircraft comes into contact with another aircraft.

As described in JP-A H08-160846, it is conceivable to use a virtual instructor aircraft. However, even if the virtual instructor aircraft is merely displayed, the influence of a wake due to the virtual instructor aircraft flying ahead of the own aircraft is not simulated. Therefore, it cannot be said that the technique described in JP-A H08-160846 provides sufficient flying training.

Accordingly, it is desirable to provide a flying training support system capable of appropriately performing formation flying training for a real aircraft.

FIG. 1 is a schematic view illustrating a cockpit of an aircraft. An instrument panel 12 is provided on a front side in a cockpit 10 of an own aircraft 1. Various instruments 14 necessary for controlling are disposed on the instrument panel 12. Examples of the instruments 14 include a position display that displays a position (for instance, latitude and longitude) of an airframe of the own aircraft 1 on a horizontal plane, an altitude display that displays an altitude of the airframe, an attitude display that displays attitude of the airframe, a magnetic bearing meter that displays a magnetic bearing, a thermometer that displays a temperature inside the airframe, a steering amount display that displays a steering amount, an output meter that displays an output of an engine, and the like. In the instrument panel 12, not only the instructions 14 described above but also various instruments 14 necessary for a pilot 2 to control the own aircraft 1 are disposed.

A transmission window 16 through which the pilot 2 visually recognizes an outside of the own aircraft 1 is provided on the front side of the cockpit 10 and above the instrument panel 12. The transmission window 16 is integrated with a head-up display (transmission display) 18 that directly displays information in the view field of the pilot 2.

For instance, a half mirror is coated on the transmission window 16 as the head-up display 18, and information is projected from a direction perpendicular to a visual line direction of the pilot 2. In this way, the pilot 2 obtains the information through the head-up display 18 while visually recognizing the real space corresponding to the outside of the own aircraft 1 and maintaining the visual line.

A piloting device 20 is provided in the vicinity of the instrument panel 12. The piloting device 20 receives operation input of the pilot 2. The piloting device 20 includes, for instance, a yoke. The pilot 2 controls the own aircraft 1 through the piloting device 20. The piloting device 20 is not limited to the yoke. The piloting device 20 may be any device that receives operation of the pilot 2 such as various levers and switches disposed on or in the vicinity of the instrument panel 12.

Figure 2:
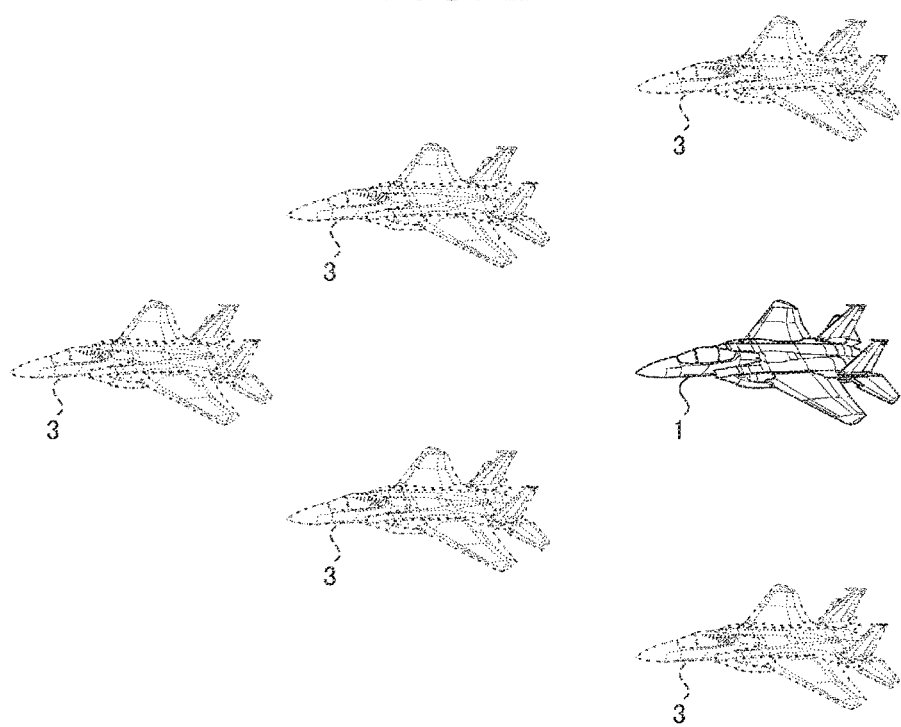
FIG. 2 is an explanatory diagram illustrating formation flying training.

FIG. 2 is an explanatory diagram illustrating the formation flying training. When training a pilot 2, flying training using an actual aircraft is essential. However, performing formation flying training involves cost depending on the number of aircrafts used. Further, although it is training, there is a danger that the own aircraft 1 comes into contact with another aircraft that is actually flying. Here, for instance, it is conceivable to display, on the head-up display 18, a virtual another aircraft (hereinafter, referred to as a "virtual another aircraft 3") which does not actually present. However, this technique does not simulate the influence (interference) and the like of the wake due to the virtual other aircraft 3 flying ahead of the own aircraft 1. Therefore, it cannot be said this technique provides sufficient flying training. Then, as illustrated in FIG. 2, it is an object of the present example to appropriately perform the formation flying training for the real aircraft by reflecting how the virtual other aircraft 3 would influence the own aircraft 1 if the virtual other aircraft 3 were to be flying while simulating the flight of the virtual other aircraft 3 with respect to the own aircraft 1.

Hereinafter, the configuration of a flying training support system 100 to achieve the object will be described in detail. Here, a configuration necessary for flying training support according to the object of the present example will be described. Description of configurations unrelated to the present example will be omitted.

(Flying Training Support System 100)

Figure 3:
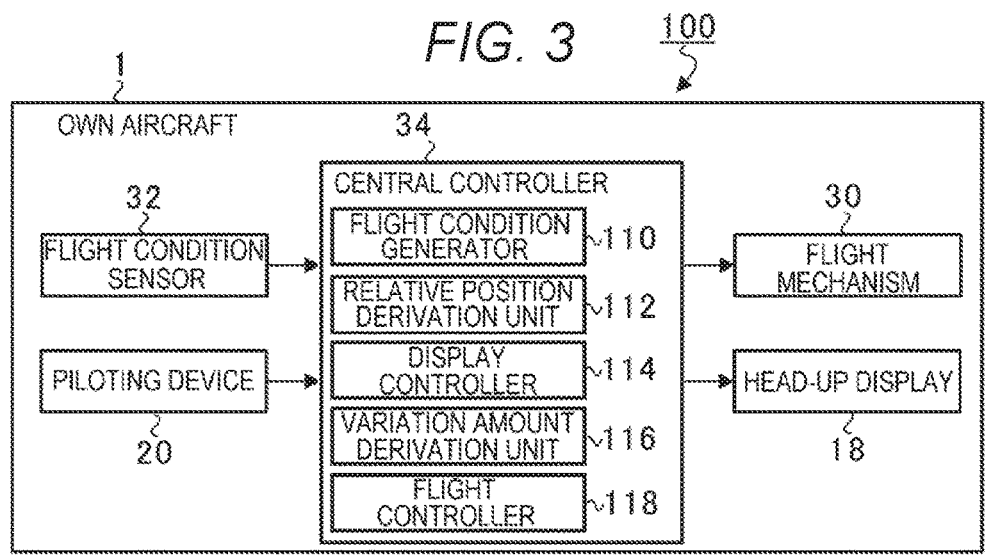
FIG. 3 is a functional block diagram illustrating a control system of an own aircraft.

FIG. 3 is a functional block diagram illustrating a control system of the own aircraft 1. A flight mechanism 30 of the own aircraft 1 includes fixed-wings fixed to the airframe and an internal combustion engine (for instance, a jet engine or a reciprocating engine) to achieve a propulsive force. The flight mechanism 30 generates a lift force around the wings by the propulsive force, to thereby keep the airframe in a floating state in the atmosphere. It should be noted that the mechanism that generates the lift force is not limited to this instance. The lift force or the propulsive force may be obtained by rotary-wings (rotor) provided rotatably.

The flight mechanism 30 may adjust the flight orientation (yaw angle), altitude, and the flight velocity by adjusting a bank angle (roll angle) and a nose angle (pitch angle) through an elevator and an aileron and adjusting output of the internal combustion engine. The pilot 2 operates the flight mechanism 30 through the piloting device 20 to control the own aircraft 1.

A flight condition sensor 32 detects current flight conditions through various sensors such as a navigation sensor provided in the own aircraft 1. Examples of the current flight conditions include a flight position (including longitude, latitude, and altitude), an aircraft velocity, aircraft attitude, a wind scale received by the aircraft, a wind direction, weather, and an atmospheric pressure, a temperature, and a humidity around the aircraft.

A central controller 34 is implemented by a semiconductor integrated circuit including a central processing unit (CPU), a ROM which stores programs and the like, and a RAM serving as a work area. The central controller 34 manages and controls the entire own aircraft 1. The central controller 34 operates in cooperation with the ROM and the RAM so as to serve as a flight condition generator 110, a relative position derivation unit 112, a display controller 114, a variation amount derivation unit 116, and a flight controller 118. The flight condition generator 110, the relative position derivation unit 112, the display controller 114, the variation amount derivation unit 116, and the flight controller 118 serve as a flying training support system 100. Hereinafter, a flying training support process performed by the flying training support system 100 will be described in detail based on the operation of each functional unit of the central controller 34.

(Flying Training Support Process)

Figure 4:
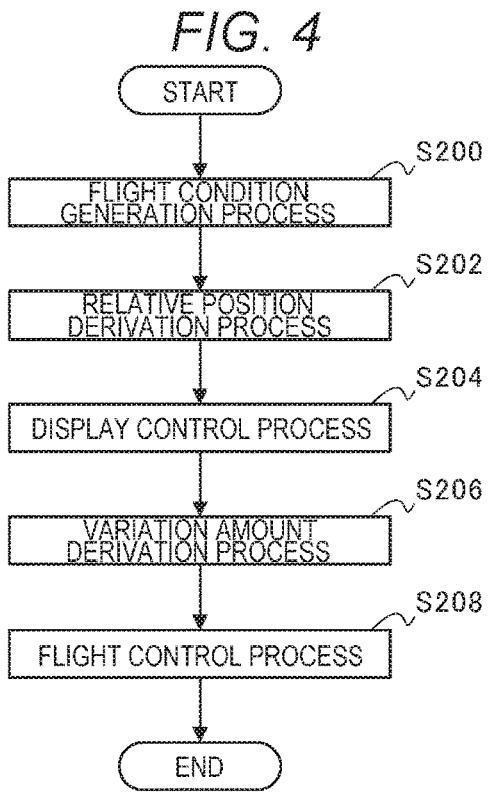
FIG. 4 is a flowchart of a flying training support process.

FIG. 4 is a flowchart of the flying training support process. Here, the flying training support process is performed in accordance with interrupt signals generated every predetermined time. In the flying training support process, the flight condition generator 110 generates a simulated flight condition of the virtual other aircraft 3 (S200). The relative position derivation unit 112 derives a relative position of the virtual other aircraft 3 with respect to the own aircraft 1 (S202). The display controller 114 superimposes and displays the relative position of the virtual other aircraft 3 in a real space (S204). The variation amount derivation unit 116 derives a simulated variation amount by which the own aircraft 1 would vary due to the flight of the virtual other aircraft 3 (S206). The flight controller 118 actually varies the own aircraft 1 so as to make the own aircraft 1 in a state where the own aircraft 1 varies by the simulated variation amount (S208).

(Flight Condition Generation Process S200)

The flight condition generator 110 simulates flight of the virtual other aircrafts 3 based on flight paths, flight velocities, flight attitudes, and the like that are preset for the virtual other aircrafts 3, respectively. The number of virtual other aircrafts 3 of which flight the flight condition generator 110 simulates is set in advance through operation input. Various related-art techniques may be employed for the simulation of the flight of the virtual other aircrafts 3. Thus, the detailed description of the simulation will be omitted here.

During the actual flight of the own aircraft 1, the flight condition generator 110 derives a flight condition of each of the virtual other aircrafts 3 at that time as if the virtual other aircrafts 3 were to perform the formation flying together with the own aircraft 1. Hereinafter, the flight condition in which the own aircraft 1 is actually flying will be referred to as a "real flight condition". Also, the simulated flight condition of the virtual other aircraft 3 will be referred to as a "simulated flight condition".

(Relative Position Derivation Process S202)

The relative position derivation unit 112 derives the relative position of the virtual other aircraft 3 with respect to the own aircraft 1 based on the simulated flight condition of the virtual other aircraft 3 and the real flight condition of the own aircraft 1. For instance, when the flight velocities and the flight attitudes of the virtual other aircraft 3 and the own aircraft 1 are identical with each other, but the flight path (flight position) of the virtual other aircraft 3, compared with the flight path of the own aircraft 1, is deviated by three-dimensional coordinates (α, β, γ) and when a roll axis and the fixed-wings of the own aircraft 1 form a plane, the relative position derivation unit 112 derives the three-dimensional coordinates (α, β, γ) as the relative position of the virtual other aircraft 3 with respect to the own aircraft 1.
(Display Control Process S204)

Figure 5:
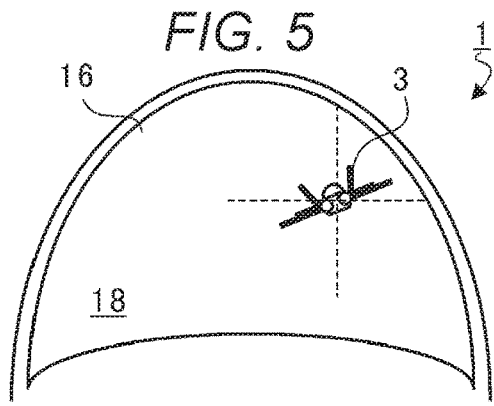
FIG. 5 is an explanatory diagram illustrating a display mode of an indicator indicating a virtual another aircraft.

FIG. 5 is an explanatory diagram illustrating a display mode of an indicator indicating the virtual other aircraft 3. The display controller 114 displays the indicator (symbol) indicating the virtual other aircraft 3 on the head-up display 18 such that the pilot 2 can recognize that the virtual other aircraft 3 is present at the above described relative position (that is, the three-dimensional coordinates (α, β, γ)). Therefore, the pilot 2 visually recognizes, through the head-up display 18, the virtual other aircrafts 3 superimposed in the real space outside the own aircraft 1. Also, the pilot 2 receives the training as if the own aircraft 1 were to perform the formation flying together with the virtual other aircrafts 3.
(Variation Amount Derivation Process S206)

Based on the simulated flight condition of the virtual other aircraft 3 generated by the flight condition generator 110 and the relative position of the virtual other aircraft 3 derived by the relative position derivation unit 112, the variation amount derivation unit 116 derives the simulated variation amount by which the own aircraft 1 would vary due to the flight of the virtual other aircraft 3 if the virtual other aircraft 3 were to fly ahead of the own aircraft 1.

Figure 6:
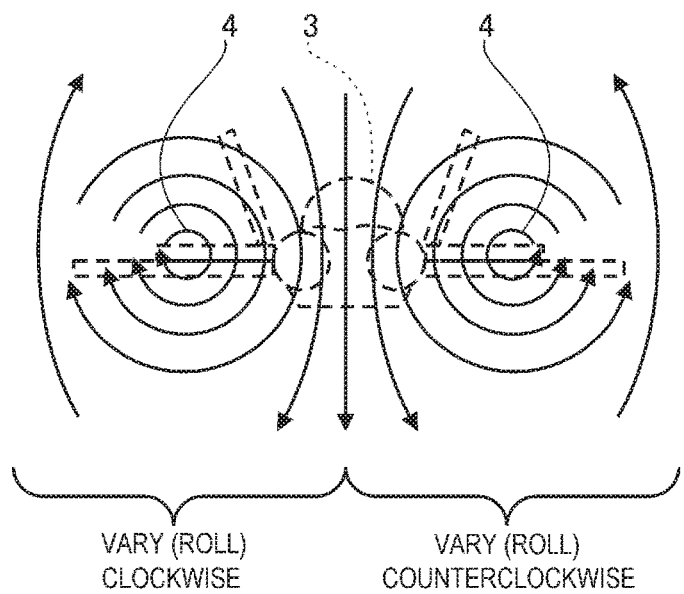
FIG. 6 is an explanatory diagram illustrating how the flight of the virtual other aircraft influences the own aircraft due.

FIG. 6 is an explanatory diagram illustrating how the flight of the virtual other aircraft 3 influences the own aircraft 1. Here, it is simulated that the virtual other aircraft 3 is flying ahead of the own aircraft 1. Therefore, vortices of airflow (wing tip vortices) caused by a pressure difference between upper and lower surfaces of each wing of the virtual other aircraft 3 and turbulence 4 due to a blast of a jet engine are generated in rear of the virtual other aircraft 3. The turbulence 4 occurs in directions indicated by the arrows in FIG. 6. The wind speed increases toward the center.

For instance, when the own aircraft 1 is positioned in rear of and left to the virtual other aircraft 3, the own aircraft 1 is influenced by the turbulence 4 and varies (rolls) clockwise by the simulated variation amount, and when the own aircraft 1 is positioned in rear of and right to the virtual other aircraft 3, the own aircraft 1 is influenced by the turbulence 4 and varies (rolls) counterclockwise by the simulated variation amount.
(Flight Control Process S208)

Figure 7:
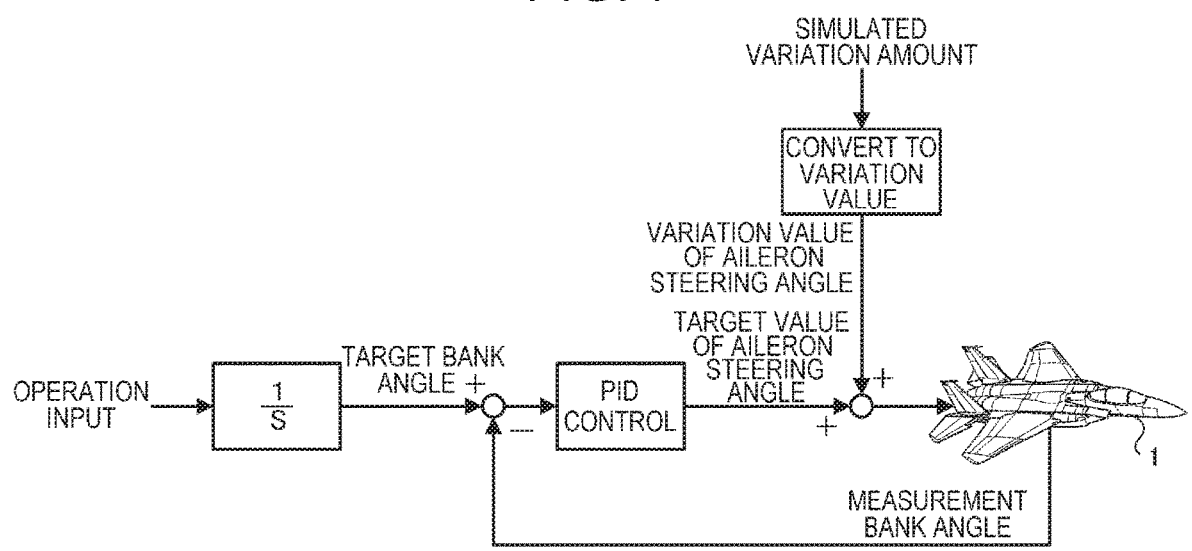
FIG. 7 is an explanatory diagram illustrating control blocks of a flying training support system.

FIG. 7 is an explanatory diagram illustrating control blocks of the flying training support system 100. For convenience of description, the following description will focus on the control in the roll direction. It is needless to say that this example is also applicable to control of other attitude angles (yaw and pitch), flight velocity, and the like.

First, the flight controller 118 derives a target bank angle based on operation input of the piloting device 20, for instance, by integrating tilt angles or tilt forces of the yoke. Then, the flight controller 118 derives a target value of an aileron steering angle by subtracting a measurement bank angle measured by the flight condition sensor 32 from the target bank angle and performing the PID control. In this way, the attitude of the own aircraft 1 varies according to the target value of the aileron steering angle.

At this time, the flight controller 118 actually varies the own aircraft 1 so as to make the own aircraft 1 in a state where the own aircraft 1 varies by the simulated variation amount. Specifically, the flight controller 118 converts the simulated variation amount into a variation value of the aileron steering angle for realizing the simulated variation amount, adds the variation value of the aileron steering angle to the target value of the aileron steering angle after the PID control in FIG. 7, and then sets the result to a new target value of the aileron steering angle. With this configuration, the influence that would be caused if the virtual other aircraft 3 were to be flying ahead of the own aircraft 1 is appropriately reflected to the own aircraft 1.

For instance, as illustrated in FIG. 6, when the own aircraft 1 is positioned in rear of and left to the virtual other aircraft 3, the own aircraft 1 is expected to only vary (bank) clockwise by the simulated variation amount due to the influence of the turbulence 4. Therefore, the flight controller 118 adds to, the target value of the aileron steering angle, the variation value of the aileron steering angle that varies the own aircraft 1 by the simulated variation amount, so as to make the own aircraft 1 in a state where the own aircraft 1 varies by the simulated variation amount. In this way, the own aircraft 1 rotates clockwise in the roll direction.

Here, in order to prevent the own aircraft 1 from rolling clockwise, the pilot 2 operates the piloting device 20 to rotate the own aircraft 1 counterclockwise in the roll direction. In this way, the target value of the aileron steering angle and the variation value of the aileron steering angle offset each other, and the bank angle of the own aircraft 1 is maintained.

With this configuration, the flying training of the formation flying is appropriately performed for a real aircraft while reducing the cost using the virtual other aircrafts 3. In addition to the flying training, for instance, during mission flight, the virtual other aircraft 3 may be used as a pacemaker. Following the virtual other aircraft 3 allows for an accurate mission, and the mental burden of the pilot 2 is reduced.

During a simulated flight with the assumption that the virtual other aircraft 3 is not present in the vicinity of the own aircraft 1 and the own aircraft 1 is not influenced by the flight of the virtual other aircraft 3, the variation derivation unit 116 derives no simulated variation amount or sets the simulated variation amount to be 0. The flight controller 118 controls the own aircraft 1 by using the result and setting the variation amount of the aileron steering angle to be 0.

The flying training support process does not limit a timing at which the variation derivation unit 116 and the flight controller 118 are enabled. In order to avoid contacting with other obstacles due to the training, for instance, the variation amount derivation unit 116 and the flight controller 118 may be enabled only when the altitude of the own aircraft 1 is equal to or higher than a predetermined altitude or only when the own aircraft 1 is located in a predetermined test airspace. In addition, the variation derivation unit 116 and the flight controller 118 may be disabled during take-off and landing or approaching.

A program that causes a computer to function as the flying training support system 100 and a computer-readable storage medium storing the program, such as a flexible disc, a magneto-optical disc, a ROM, a CD, a DVD, and a BD, may be provided. Here, the program refers to a data processing member described in any language or any description method.

The examples of the present invention have been described above with reference to the accompanying drawings. It is needless to say that the present invention is not limited to such examples. It is obvious that those skilled in the art would conceive various changes and modifications within the scope of claims, and it should be understood that such changes and modifications are included in the technical scope of the present invention.

Each step of the flying training support process in this specification is not necessarily processed in chronological order according to the order described in the flowchart, and may include a parallel process or a subroutine process.

The examples of the present invention are applicable to a flying training support system that supports flying training.

The invention claimed is:

1. A flying training support system comprising:
 a flight condition generator configured to generate a simulated flight condition of a virtual another aircraft;
 a relative position derivation unit configured to derive a relative position of the virtual other aircraft with respect to an own aircraft based on the simulated flight condition of the virtual other aircraft and a real flight condition of the own aircraft;
 a display controller configured to display an indicator indicating the virtual other aircraft at the relative position of the virtual other aircraft on a transmission display;
 a variation amount derivation unit configured to derive a simulated variation amount by which the own aircraft would vary due to flight of the virtual other aircraft, based on the simulated flight condition of the virtual other aircraft and the relative position of the virtual other aircraft, wherein the variation amount derivation unit is enabled when an altitude of the own aircraft is equal to or higher than a predetermined altitude or when the own aircraft is located in a predetermined test airspace; and
 a flight controller configured to actually vary the own aircraft so as to make the own aircraft in a state where the own aircraft varies by the simulated variation amount, wherein the flight controller is enabled when the altitude of the own aircraft is equal to or higher than the predetermined altitude or when the own aircraft is located in a predetermined test airspace.

2. The flying training support system of claim 1, wherein the variation amount derivation unit derives a simulated variation amount in a roll rotation direction of the own aircraft by the virtual another aircraft.

\* \* \* \* \*